United States Patent [19]

Nishitani et al.

[11] Patent Number: 4,815,496

[45] Date of Patent: Mar. 28, 1989

[54] POWER FEEDER FOR SOLENOID VALVES

[75] Inventors: Kenzi Nishitani; Hideyuki Takata, both of Soka, Japan

[73] Assignee: SMC Corporation, Tokyo, Japan

[21] Appl. No.: 139,028

[22] Filed: Dec. 29, 1987

[30] Foreign Application Priority Data

Dec. 29, 1986 [JP] Japan ........................... 61-202658[U]

[51] Int. Cl.⁴ ............................................. F16K 31/02

[52] U.S. Cl. .................................... 137/884; 137/271; 137/560

[58] Field of Search ................... 137/269, 271, 561 R, 137/884, 560

[56] References Cited

U.S. PATENT DOCUMENTS

| | | | |
|---|---|---|---|
| 3,215,158 | 11/1965 | Bass, Jr. et al. | 137/269 |
| 3,504,704 | 4/1970 | Beckett et al. | 137/269 X |
| 4,399,836 | 8/1983 | de Versterre et al. | 137/884 X |
| 4,507,707 | 3/1985 | Willis | 137/884 X |
| 4,512,362 | 4/1985 | Groeschner | 137/501 R |

FOREIGN PATENT DOCUMENTS

| | | | |
|---|---|---|---|
| 0104876 | 6/1985 | Japan | 137/884 |
| 0143284 | 7/1985 | Japan | 137/884 |
| 61-97887 | 6/1986 | Japan . | |

*Primary Examiner*—A. Michael Chambers
*Assistant Examiner*—John C. Fox
*Attorney, Agent, or Firm*—Oblon, Fisher, Spivak, McClelland & Maier

[57] ABSTRACT

A power feeder for solenoid valves has a printed wiring board carrying a printed feeder circuitry firmly supported on a manifold base. Thus, electrical connection between the solenoid valves and printed wiring board is accomplished simultaneously with the fastening of the solenoid valves to the manifold base. U-shaped brackets having a width corresponding to the width of each solenoid valve are attached to rails provided on one side of the manifold base by fitting engaging shoes provided on one side wall of the brackets over the rails. The printed wiring board is placed on the side walls of the brackets, while the feeding terminal of a terminal box at one end of the connected brackets is connected to the receiving terminal of the printed wiring board by means of a cable connector passed through the brackets. Feeding terminals corresponding to the receiving terminals of the solenoid valves are provided on the printed wiring board so that the feeding terminals on the printed wiring board are directly connected to the receiving terminals of the solenoid valves as the solenoid valves are mounted on the manifold base. This arrangement provides firm support to the printed wiring board, assures easy and sure solenoid valve mounting and feeder terminal connection. Also, the printed wiring board is covered with the brackets and base plates that afford adequate protection from the workshop environment that might be unfavorable.

7 Claims, 3 Drawing Sheets

POWER FEEDER FOR SOLENOID VALVES

FIELD OF THE INVENTION

This invention relates to a power feeder that supplies electric power to a plurality of solenoid valves mounted on a manifold base.

DESCRIPTION OF THE PRIOR ART

It has been known (as disclosed, for example, in Japanese Provisional Utility Model Publication No. 97887 of 1986) that wiring to a plurality of solenoid valves mounted on a manifold base for centralized control is simplified by means of a printed wiring board having a plurality of feeding terminals to be connected to the receiving terminals of the solenoid valves and a printed power supply circuit.

In conventional solenoid valve power feeders employing printed wiring boards, however, the receiving terminals of the solenoid valves are individually connected to the feeding terminals on the printed wiring board after the solenoid valves have been fixed on the manifold base. Such designs have necessitated complex assembling and operation and have not assured steady terminal-to-terminal connection.

OBJECTS OF THE INVENTION

An object of this invention is to provide a power feeder for solenoid valves that permits simpler and surer connection of the feeding terminals of solenoid valves by making it possible to complete electric connection between the solenoid valves and a printed wiring board simultaneously with the fixing of the solenoid valves to a manifold base by increasing the rigidity with which the printed wiring board is attached to the manifold base.

Another object of this invention is to provide a power feeder for solenoid valves in which solenoid valves are fixed on the manifold base in such a manner as to protect the printed wiring board, thereby obviating the need to provide separate protective means for the board.

Still another object of this invention is to provide a power feeder for solenoid valves in which as many brackets as the solenoid valves to be mounted on the manifold base are also attached thereto, with the solenoid valves then fitted to the brackets through a printed wiring board. This arrangement permits always using brackets of the same type, instead of preparing brackets of different types depending on the size of the manifold base and/or the number of solenoid valves installed. This, in turn, facilitates parts control and adjustment to change in the size of the manifold base and the number of solenoid valves.

Yet another object of this invention is to provide a power feeder for solenoid valves in which minimum provision is added to the manifold base itself to assure firm fastening of brackets. The manifold base with this minimum additional provision can be used for the fastening of conventional common solenoid valves, can be converted from a manifold base of the known type, and can be made by using part of conventional manifold base manufacturing equipment.

SUMMARY OF THE INVENTION

In order to achieve the above objects, this invention employs the following technical measures in a power feeder for solenoid valves that supplies power to a plurality of solenoid valves mounted on a manifold base from the feeding terminals of a printed wiring board, on which power supply circuitry is printed, fastened to the manifold base to the receiving terminals of the solenoid valves connected to said feeding terminals: Rails extending in the direction in which solenoid valves are to be disposed side by side are provided on one side of the manifold base. On one of the side walls of a U-shaped bracket having a width corresponding to each solenoid valve is provided an engaging shoe adapted to engage with said rails and slide therealong without getting disengaged therefrom. Said solenoid valves are attached to the manifold base by means of as many brackets fitted on the rails by engagement of said engaging shoe. the printed wiring board is supported on the opposite side wall of the brackets. A terminal box is provided at one end of a group of bracket disposed side by side, with a feeding terminal thereof being connected to a receiving terminal on the printed wiring board by means of a cable connector passed through the brackets. Each solenoid valve has a receiving terminal provided in that part thereof which will face the printed wiring board when mounted on the manifold base. The printed wiring board, on the other hand, has feeding terminals corresponding to the receiving terminals of the individual solenoid valves. Each feeding terminal projects above a base plate, which is placed on the printed wiring board in such a manner as to cover the printed circuitry, through an opening provided therein. When a solenoid valve is mounted on the manifold base, the receiving terminal of the solenoid valve can be thus directly connected to the corresponding feeding terminal on the printed wiring board.

In this type of power feeder, the U-shaped brackets adapted to support the printed wiring board are fastened to the manifold base by bringing the engaging shoe on one side wall of each bracket into engagement with the longitudinal rails provided on the manifold base. This provides firm support to the printed wiring board, permits the receiving terminals of the solenoid valve to be connected to the feeding terminals of the printed wiring board simultaneously with the mounting of the solenoid valves onto the manifold base, and thus assures easy establishment of electric connection therebetween.

With the printed wiring board covered with the brackets below and the base plates above, the power feed circuitry including printed wiring thereon is protected from the workshop environment that might be unfavorable.

Provision made to use as many brackets as solenoid valves permits using a plurality of brackets of one and the same type whose number varies with the length of the manifold base and printed wiring board that, in turn, changes with the number of solenoid valves to be mounted thereon. Differing simply in that rails are provided on one side thereof, the manifold base itself is more or less interchangeable with conventional ones.

DESCRIPTION OF THE PREFERRED EMBODIMENT

Figure 1:
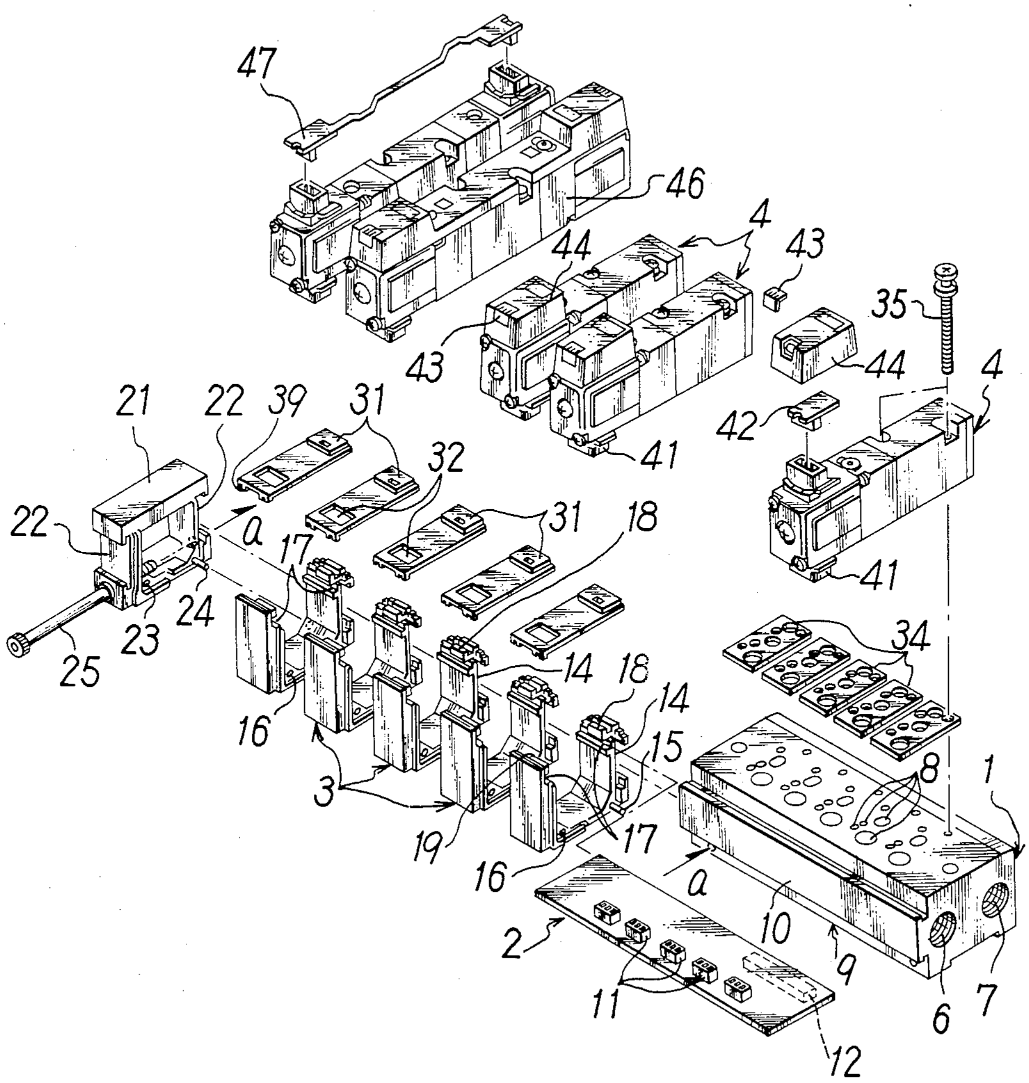
FIG. 1 is an exploded perspective view showing the way in which solenoid valves are mounted on a manifold base 1 of a preferred embodiment of this invention.
Figure 2:
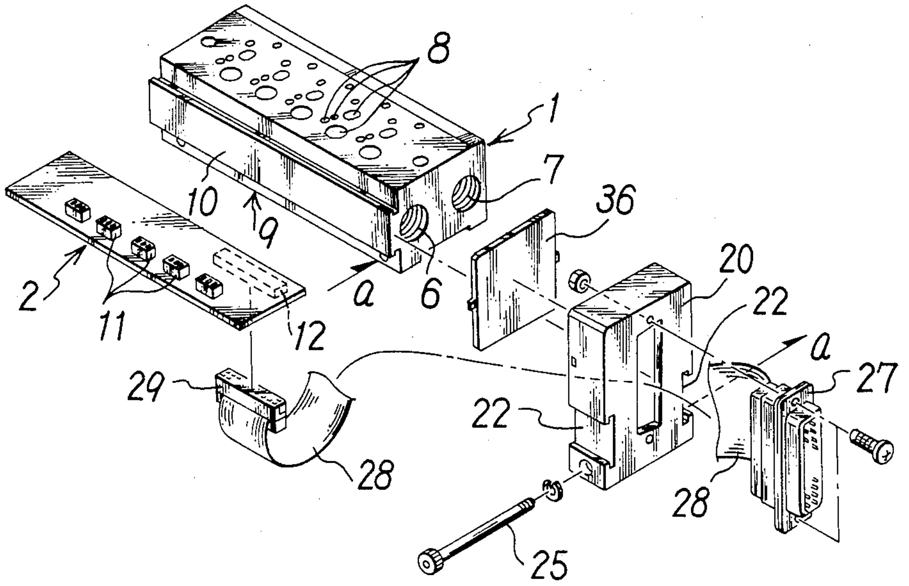
FIG. 2 is an exploded perspective view showing the wiring from a terminal box to a printed wiring board.

A preferred embodiment of this invention shown in FIGS. 1 and 2 essentially comprises a manifold base 1, a printed wiring board 2, a plurality of brackets 3 to support said printed wiring board 2, and a plurality of solenoid valves 4 to be mounted on said manifold base 1.

The manifold base 1 has an input passage 6 and a discharge passage 7, both extending lengthwise, with groups of fluid passages 8 individually communicating with said passages 6 and 7 and an output passage (not shown) provided in the top surface thereof at given intervals. An engaging longitudinal projection 10 to form rails 9 is provided on one side of the manifold base 1 that is perpendicular to said top surface. The output passage not shown is provided on that side of the manifold base which is opposite to the longitudinal projection 10.

The printed wiring board 2 has feeding terminals 11 in places that correspond to a plurality of solenoid valves 4 to be mounted on the manifold base 1 and a receiving terminal 12 in one corner of the underside thereof. The feeding terminals 11 and receiving terminal 12 are electrically connected by printed wiring circuitry. The circuitry on the printed wiring board 2 indcludes an operation control circuit for the solenoid valves 4, with necessary electronic parts attached to the underside of the printed wiring board 2.

Figure 3:
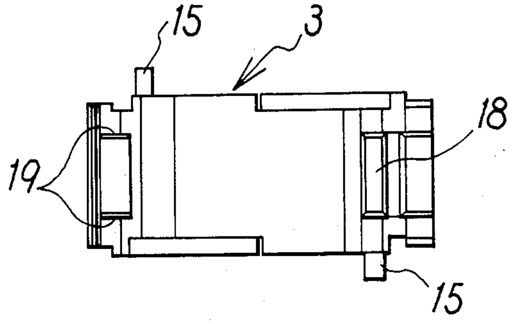
FIG. 3 is a plan view of a bracket used in the same preferred embodiment.
Figure 4:
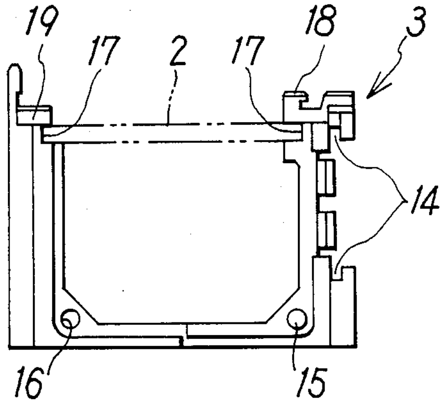
FIG. 4 is a side elevation of the same bracket.
Figure 5:
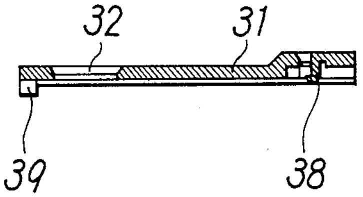
FIG. 5 is a sectional view of a base plate which is fastened to the bracket.

Corresponding to said solenoid valve 4, the U-shaped bracket 3 has a width equal to the space left between the adjoining fluid passages 8. As is detailed in FIGS. 3 and 4, an engaging shoe 14 adapted to be longitudinally fitted over the projection 10 forming the rails 9 is provided on one side wall of the bracket 3. Paired grooves 17, 17 to receive the inserted printed wiring board 2 are provided near the open ends of the opposite side walls to hold the printed wiring board 2 therebetween. Engaging shoes 18, 19 to carry a base plate 31 to be described later are provided at the top ends of the two side walls. A projection 15 and a receiving hole 16, the former being adapted to be fitted into the latter, are provided on those surfaces of the adjoining brackets 3, 3.

The desired number of brackets 3, the number being equal to that of solenoid valves 4 to be mounted, are attached to the manifold base 1 side by side by longitudinally fitting over the rails 9, with the projection 15 on one bracket fit into the receiving hole 16 in an adjoining bracket.

A terminal box 20 and a holding cover 21 to close both ends of the connected brackets 3 have engaging shoes 22, 22 identical in shape to said engaging shoe 14 on the opposite side walls thereof, and a receiving hole 23 and a projection 24 adapted to engage with said projection 15 and receiving hole 16 on the surfaces thereof facing the brackets 3. The terminal box and holding cover close the end surfaces of the connected brackets 3 by fitting either one of the engaging shoes 22 over the longitudinal projection 10 and bringing the receiving hole 23 and projection 24 into engagement with the projection 15 and receiving hole 16, respectively, and then fastened to the manifold base 1 by screwing fitting bolts 25 therethrough against the manifold base 1 (as indicated by arrow "a" in the figure), whereby the printed wiring board 2 held between the grooves 17, 17 of the bracket 3 is fastened to the manifold base 1.

Having the engaging shoes 22, 22 on both side walls, the terminal box 20 and holding cover 21 can be fastened to either end surface of the connected brackets 3.

A first feeding terminal 27 carrying many connecting pins is bolted to the terminal box 20, with the connecting pins directed outward. A cable connector 28 electrically connected to said first feeding terminal 27 has a second feeding terminal 29 connectable to said receiving terminal 12 at the opposite end thereof. The cable connector 28 is long enough to permit connection to the receiving terminal 12 irrespective of whether the terminal box 20 is placed at one end of the connected brackets 3 or the other, and passed through the U-shaped brackets 3 for connection to the receiving terminal 12.

While the printed circuitry on the top surface of the printed wiring board 2 is covered by a base plate 31 which has engaging portions 38, 39 to be engaged with engaging shoes 18, 19 at the top end of each bracket 3, the feeding terminal 11 projects above the base plate 31 through an opening 32 provided therein.

For each group of fluid passages 8, a solenoid valve 4 is fastened onto the manifold base 1 with bolts 35, 35, with a gasket 34 placed therebetween. When thus mounted on the manifold base 1, the input, output and discharge ports of the solenoid valve 4, as with those of conventional solenoid valves, individually communicate with the fluid passages 8 through the openings in the gasket 34. The solenoid valve 4 has a receiving terminal 41 connected to the under surface of a solenoid thereon projecting toward the bracket 3 and thus facing the printed wiring board 2. When the solenoid valve is mounted on the manifold base 1, the receiving terminal 41 connects directly to each feeding terminal 11 on the printed wiring board 2.

The solenoid valve 4 has a parts mount 42 carrying indicator lamp, counter-electromotive cell and other electronic parts on top thereof. The parts mount 42 is covered with a cover 44 having a lamp window 43 thereon. The solenoid valve may be a double solenoid valve 46 having two solenoids at both ends of the valve segment, in which a solenoid at an end opposite to the feeding terminal 11 is electrically connected by a feeder 47 placed on the valve 46 to a terminal on the other solenoid, with power supplied through a receiving terminal 41.

Reference numeral 36 designates a plate that covers the upper half of the terminal box 20 closer to the bracket 3.

Although not shown, a projection similar to the longitudinal projection 10 may be provided on one side of the brackets 3, terminal box 20 and holding cover 21 to engage with rails 9 provided on the manifold base 1, whereby the brackets 3, terminal box 20 and holding cover 21 are attached to the manifold base 1.

Now the assembling procedure of the above preferred embodiment will be described in the following.

As many brackets 3 as solenoid valves 4 are attached to the manifold base 1 by bringing the engaging shoes 14 of the brackets 3 into engagement with the projection on the manifold base 1 and the projection 15 on one bracket with the receiving hole 16 on another. Both sides of the printed wiring board 2 are passed through the opposite grooves 17, 17 provided on the brackets 3.

By then fastening the terminal box 20 and holding cover 21 at both ends of the connected brackets 3 to the manifold base 1 with the bolts 25, 25, the connected brackets 3 and printed wiring board 2 are fastened to the manifold base 1. The second feeding terminal 29 should be connected to the receiving terminal 12 of the printed wiring board 2 beforehand. Then, the base plates 31 are fitted into the engaging shoes 18, 19 at the top end of the brackets 3, with the feeding terminals 12 of the printed wiring board 2 projected through the openings 32 in the base plates 31.

Next, a solenoid valve 4 is mounted for each set of fluid passages 8 on the manifold base and fastened to the manifold base 1 with the bolt 35 after directly connecting the receiving terminal 41 to the feeding terminal 11 of the printed wiring board 2. Because both sides of the printed wiring board 2 are firmly supported by the grooves 17, 17, electrical connection of the terminals can be accomplished simultaneously with the mounting of the solenoid valves.

In this power feeder for solenoid valves, the printed wiring board 2 to supply power to the plurality of solenoid valves 4 mounted on the manifold base 1 is covered by such protecting members as the brackets 3 and base plates 31. Thus the printed wiring board 2 is protected from the workshop environment that might be unfavorable. Assembled by simple fitting, the brackets 3, base plates 31 and other members can be readily disassembled by detaching either of the terminal box 20 and holding cover 21 from the manifold base 1. This assures easy servicing and control of the power feeding segment.

Also, provision made to install as many brackets 3 and base plates 31 as solenoid valves 4 permits using the brackets 3 and base plates 31 of one and the same type with a large number of different manifold bases 1 and printed wiring boards 2 carrying different numbers of solenoid valves. Use of such common interchangeable parts facilitates parts control.

What is claimed is:

1. In a power feeder for solenoid valves that supplies power from a feeding terminal on a printed wiring board fastened to a manifold base to a receiving terminal of a plurality of solenoid valves mounted on said manifold base, the improvement which comprises:

rails extending in a direction in which said solenoid valves are disposed side by side, said rails being provided on one side of said manifold base;

a plurality of U-shaped brackets each having a width corresponding to one of said solenoid valves, said brackets each having an engaging shoe adapted to slide along said rails while engaged therewith without detaching therefrom, and a plurality of said brackets being fitted over said rails for fastening the same number of solenoid valves to said manifold base with said printed wiring board being supported on an opposite side wall of the brackets;

a terminal box disposed at one end of the group of said connected brackets, said terminal box having a feeding terminal connected to a receiving terminal of said printed wiring board by means of a cable connector passed through at least some of said brackets;

a receiving terminal provided on a surface of each solenoid valve, which faces said printed wiring board;

a plurality of feeding terminals provided on the printed wiring board, each of said feeding terminals on the printed wiring board corresponding to said receiving terminal of one said solenoid valve, and a plurality of base plates placed over the printed circuitry on said printed wiring board, said base plate having a plurality of openings through which said feeding terminals are projected, respectively, whereby said feeding terminals on said printed wiring board are adapted to be directly connected to said receiving terminals of said solenoid valves by mounting said solenoid valves onto said manifold base.

2. A power feeder for solenoid valves as claimed in claim 1, wherein said U-shaped bracket has opposite side walls, and wherein opposite grooves into which both sides of said printing wiring board are passed are provided near an open top end of said opposite side walls of said U-shaped bracket.

3. A power feeder for solenoid valves as claimed in claim 2, including a terminal box and a holding cover to close both ends of said connected bracket bolted to said manifold base, thereby fastening said brackets and said printed wiring board held between said grooves on the brackets to said manifold base.

4. A power feeder for solenoid valves as claimed in claim 3, wherein engaging shoes fitting over said rails on said manifold base are provided on opposite side walls of said terminal box and a holding cover for closing both ends of said connected brackets, whereby said terminal box is allowed to be attached in any desired direction by bringing either of said engaging shoes into engagement with said rails on said manifold base.

5. A power feeder for solenoid valves as claimed in claim 1, wherein engaging shoes for mounting said base plate to said U-shaped bracket are provided at a top end of said opposite side walls of said bracket.

6. A power feeder for solenoid valves as claimed in claim 1, wherein a projection and a mating receiving hole are provided on meeting surfaces of adjoining brackets.

7. A power feeder for solenoid valves as claimed in claim 1, wherein said solenoid valve is a double solenoid valve having two solenoids at both ends of a valve segment thereof, and said feeding terminal and one of said solenoids located at the opposite side thereof are electrically connected to a terminal of the other solenoid through a feeder, whereby power is supplied through said receiving terminal of the other solenoid.

* * * * *